US007928339B2

(12) United States Patent
Regere et al.

(10) Patent No.: US 7,928,339 B2
(45) Date of Patent: Apr. 19, 2011

(54) DEVICE FOR GASEOUS PLASMA STERILIZATION

(75) Inventors: Pascal Regere, Bordeaux (FR); André Ricard, Toulouse (FR); Sarah Cousty, Toulouse (FR)

(73) Assignee: Societe pour la Conception des Application des Technique Electroniques-SATELEC, Merignac (FR)

( * ) Notice: Subject to any disclaimer, the term of this patent is extended or adjusted under 35 U.S.C. 154(b) by 755 days.

(21) Appl. No.: 11/722,722

(22) PCT Filed: Dec. 21, 2005

(86) PCT No.: PCT/FR2005/003223
§ 371 (c)(1),
(2), (4) Date: Jun. 25, 2007

(87) PCT Pub. No.: WO2006/070107
PCT Pub. Date: Jul. 6, 2006

(65) Prior Publication Data
US 2009/0035196 A1 Feb. 5, 2009

(30) Foreign Application Priority Data
Dec. 23, 2004 (FR) ..................................... 04 13818

(51) Int. Cl.
*B23K 10/00* (2006.01)

(52) U.S. Cl. ......... 219/121.54; 219/121.57; 219/121.43; 219/682; 219/690; 422/21; 422/186.21

(58) Field of Classification Search .................. 219/682, 219/702, 690, 121.43, 121.52, 121.54, 121.57; 362/21.02; 422/186, 186.28, 186.21, 21, 422/22, 24
See application file for complete search history.

(56) References Cited

U.S. PATENT DOCUMENTS 4,317,976 A 3/1982 Noda et al.
4,849,595 A 7/1989 Fowler et al.
5,325,020 A 6/1994 Campbell et al.
6,445,596 B1 9/2002 Mihara et al.

FOREIGN PATENT DOCUMENTS

JP 06104079 6/2007

OTHER PUBLICATIONS

Patent Abstract of Japan vol. 018, No. 372 (E-1577)m Jul. 13, 1994.

*Primary Examiner* — Mark H Paschall
(74) *Attorney, Agent, or Firm* — Young & Thompson

(57) ABSTRACT

A device for producing a gas plasma by ionisation of a gas using a microwave source of determined nominal power ($P_n$), includes a magnetron 7 receiving its electric energy from a supply circuit. The device is characterized in that the power ($P_d$) delivered by the supply circuit to the magnetron 7 is no more than one quarter of the nominal power ($P_n$) of the magnetron 7.

17 Claims, 1 Drawing Sheet

DEVICE FOR GASEOUS PLASMA STERILIZATION

BACKGROUND OF THE INVENTION

The present invention pertains to a sterilization device for medical instruments in particular, of the type which uses a gas plasma.

It is recalled that in sterilization techniques having recourse to said plasma, a gas is used which does not itself have bactericidal properties, which is subjected to a sufficiently high electric field to cause its ionisation and the separation of its molecules. The gas produced downstream of the plasma, called "post-discharge" gas has sterilizing properties. This gas enters a treatment chamber where it exerts its bactericidal action on the instruments to be sterilized.

DESCRIPTION OF THE RELATED ART

In the prior art of the technique two main routes were proposed enabling the production of electric fields whose intensity is sufficient to cause plasma emission, namely high frequency currents (HF) and microwaves.

The high frequency current technique has the disadvantage of using electrodes subject to wear and with which it is not possible to obtain good stability of the device so that the device needs to be permanently adjusted.

The microwave technique does not have these drawbacks but is nonetheless not free of some constraints, in particular regarding lifetime and the frequency stability of the magnetron generating the microwaves.

It is known that a microwave source consists of a magnetron delivering its energy within a waveguide which transmits this energy to an energy-absorbing cavity resonator in which it is desired to conduct a certain task. This cavity therefore absorbs part of the emitted energy, and part of the remaining energy is reflected towards the magnetron. The lifetime of the magnetron is directly related to this reflected power. If it is too high, it generates a rise in temperature of the magnetron which may lead to its final breakdown.

If, on an industrial scale, it is desired to produce a gas plasma, in particular in order to use the derived post-discharge gas for the sterilization of medical instruments, it is important that the magnetron should have a long lifetime compatible with the lifetimes generally accepted in medical industry sectors. However by definition, the power absorbed in the resonant cavity is essentially variable since its depends upon the mass of instruments to be sterilized. Therefore it is important that the magnetron should be able to operate with a reflected power corresponding to its total power (which corresponds to an almost empty cavity resonator) and for a large number of times without undergoing irreversible damage.

Also, it is known that the excitation of a plasma gas by microwaves requires a strictly stable frequency since the resonant cavity has a very fine-tuned quality coefficient, so that in the event of a frequency shift the device becomes detuned and the power transmitted to the gas plasma is then no longer sufficient to ensure that it is maintained.

SUMMARY OF THE INVENTION

The purpose of the present invention is to propose a microwave generator intended for the production of a gas plasma, which remedies these disadvantages by ensuring excellent operating stability and an optimal lifetime of its magnetron.

A further subject of the invention is a device for producing a gas plasma by ionising a gas using a microwave source of determined nominal power, comprising a magnetron receiving its electric energy from a supply circuit, characterized in that the power delivered to the magnetron by the supply circuit is at least equal to one quarter of the nominal power of the magnetron. Preferably, this power lies between one tenth and one quarter of the magnetron's nominal power.

Also preferably, the power delivered to the magnetron by the supply circuit is no more than one quarter of the product of the magnetron's nominal power multiplied by the reflection coefficient of the magnetron.

The inventive device may comprise means able to limit the power delivered to the magnetron, which are such that its temperature does not exceed 80° C.

The present invention is of particular interest at production cost level, in that it can have recourse to circuits available on the household products market and which, since they are mass produced, have a particularly competitive cost price. One disadvantage of such circuits when it is desired to use the same in areas such as the medical sterilization sector, is that firstly they have a power in the order of 800 W whereas for sterilization the power which can be absorbed by the treatment cavity is in the order of only 100 W, and secondly their reliability is low.

Regarding the excess power, it will evidently be understood that it cannot be contemplated to use said circuits as such since the reflected power would then be in the order of 700 W, and the immediate effect would be to cause magnetron heating leading to its destruction.

To use said circuits it is therefore necessary to limit their power. Also it is known that magnetrons, for start-up, require a peak voltage of relatively high value in the order of 3 to 4 kv.

It must therefore be possible to achieve this power limitation without causing any notable detriment to the peak voltage required for magnetron start-up.

According to the invention the power supplied to the magnetron is limited, which will limit the energy reflected towards it, and this limitation is achieved without reducing the required starting load.

One manner of particular interest for reducing the electric power supplied to the magnetron, whilst maintaining said peak voltage at a sufficient value, is to use a voltage doubler having a diode and a capacitor arranged in series at the terminals of the secondary winding and to use a capacitor of sufficiently low value to cause the voltage to drop. Under these conditions it was found that the power supplied to the magnetron is sufficiently reduced to ensure its sufficient reliability whilst preserving its starting peak load.

It is known that magnetrons are characterized by a coefficient which characterizes their maximum permissible power which is the Standing Wave Ratio (SWR):

$$SWR=1+r/1-r$$

r being the reflection coefficient which is equal to the ratio of reflected power to emitted power.

It is therefore ascertained that the energy able to be thermally dissipated by a magnetron is proportional to its power. Therefore, bearing in mind that the mean SWR for a magnetron is in the order of 4, the corresponding reflection coefficient r is 0.6, which means that a magnetron having a nominal power of 800 watts will have a permissible reflected power of 480 watts, whereas this same value for a magnetron having a nominal power of 300 watts will only be 180 watts.

Under these conditions, if the power needed for a determined operation, sterilization for example, is taken to be 100 watts, and if it is desired that the device is able to achieve problem-free 100% dissipation of received power (which substantially relates to the case of an empty resonant enclosure), then all that is required is that the power $P_d$ delivered to the magnetron is no more than:

$$P_d=P_n\cdot r$$

$P_n$ being the nominal power of the magnetron.

It will be noted that when using a magnetron of household type, its nominal power being approximately 800 watts, it will have a permissible reflected power of 480 watts, so that it will be fully able to reliably ensure the production of a plasma for sterilization purposes requiring a power of 100 W.

It was therefore found that under these conditions the temperature rise of the magnetron is very low, thereby providing excellent frequency stability to enable it to produce a plasma when the power delivered to the magnetron lies between one tenth and one quarter of its nominal power.

BRIEF DESCRIPTION OF THE DRAWING FIGURES

As a non-limitative example an embodiment of the present invention is described below with reference to the appended drawing in which.

DESCRIPTION OF THE PREFERRED EMBODIMENTS

Figure 1:
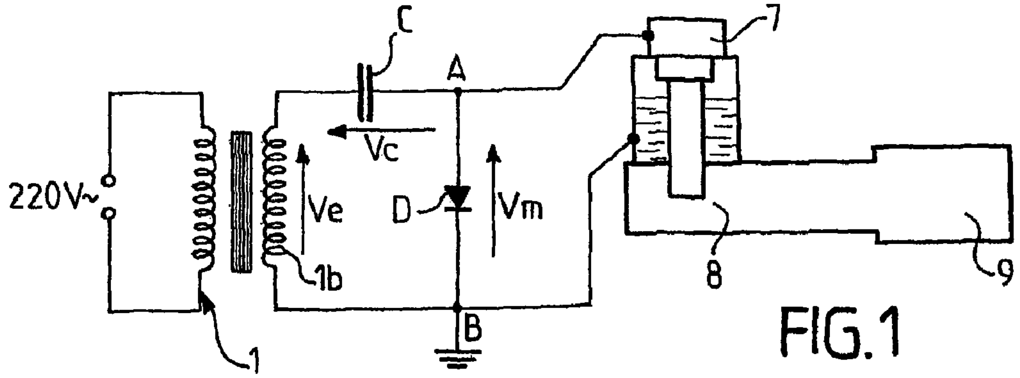
FIG. 1 is a schematic view of an inventive device.

FIG. 1 shows a supply device able to supply the magnetron with the energy it needs to produce a gas plasma. This gas plasma is particularly intended, via its post-discharge gas, to ensure a sterilizing function.

The supply essentially consists of a voltage step-up supply transformer 1, having a ratio of approximately 10, so that with a peak-to-peak supply voltage of 220 V, the peak-to-peak voltage at its secondary winding will be approximately 2200 V. Arranged in series in the secondary circuit 1*b* are a capacitor C and a diode D between whose terminals A and B a magnetron 7 is connected. This magnetron is joined by a waveguide 8 to a cavity resonator 9

The diode D and capacitor C form a voltage doubler making it possible to multiply by 2 the output voltage of transformer 1, since capacitor C becomes charged during positive alternation and when alternation becomes negative the voltage of the capacitor is added to its voltage value.

Figure 2:
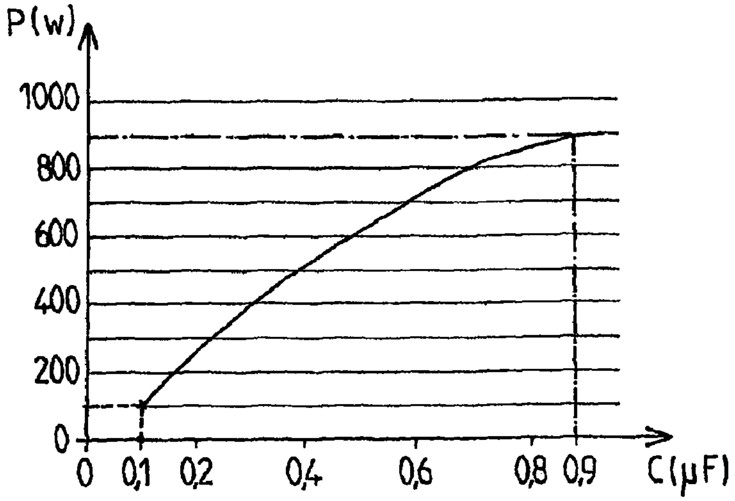
FIG. 2 is a curve showing the variation in power delivered to the magnetron in relation to the capacity value of the capacitor in the supply means.

A curve was plotted showing the variation in power P supplied by the supply circuit to the magnetron 7 in relation to the value of the capacitor C. It is therefore found in FIG. 2 that the power P decreases with the value of the capacitor. Therefore for a capacitor C of 0.9 μF, the value conventionally used for the supply of household microwave ovens, the delivered power is approximately 900 W, whereas if the value of capacitor C is reduced to 0.1 μF, this power drops to 100 W which is a value corresponding to the power used in the particular area of gas plasma production for sterilization purposes using its post-discharge gas. This is of particular interest since, even if the power is fully reflected, its value will be below the value of the permissible return power, which for a magnetron of 800 W nominal power is 480 W.

It is therefore ascertained that, through a simple replacement operation replacing a component as simple and low cost as a capacitor, it is possible to adapt and transform a low-cost commercially available supply so that it is able to ensure, both reliably and efficiently, the supply of a magnetron intended for intensive use in particular in the medical and industrial sectors.

Figure 3:
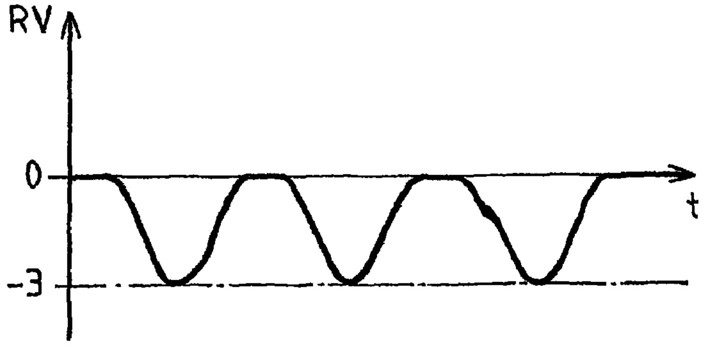
FIG. 3 is a curve showing the variation in voltage in relation to time at the terminals of the magnetron in a device of the type shown FIG. 1.

Also, a curve is shown FIG. 3 expressing the variation in voltage at terminals A and B of the magnetron supply. It is found that the peak voltage thereupon at the start of alternation is well maintained, making it possible to provide the magnetron with a proper starting load.

Figure 4:
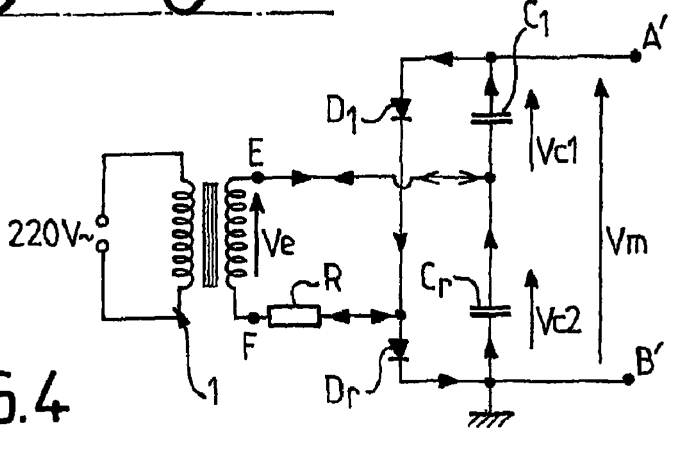
FIG. 4 is a schematic view of a variant of embodiment of the invention.

It is also possible, according to the invention, as is shown FIG. 4 to provide a double alternating supply to the magnetron. In this assembly, a loop is provided comprising two diodes in series, namely a first diode D1 and a second diode D2, the output of the first being joined to the input of the second, and two capacitors C1 and C2. An output terminal E of transformer 1 is joined between the two capacitors C1 and C2 and the other output terminal F is joined via a resistance R to the input of diode D2. The magnetron is supplied between the input terminal A' of the first diode D1 and the output terminal B' of the second diode D2. Said assembly accumulates the two voltage doublers and the voltage delivered between terminals A' and B' is the sum of the voltages at the terminals of capacitors C1 and C2. During positive alternation capacitor C1 charges via diode D1. When alternation becomes negative capacitor C2 charges via diode D2.

The invention claimed is:

1. A device for sterilization using a plasma gas by ionisation of a gas, said device comprising:

a supply circuit comprised of a voltage step-up supply transformer (1) having a ratio, an input side for connection to a peak-to-peak supply voltage, and a peak-to-peak output voltage on a secondary winding, the secondary winding having terminals;

a microwave source of determined nominal power ($P_n$), said microwave source connected to the terminals of the secondary winding of the supply circuit, said microwave source comprising a magnetron (7) receiving power ($P_d$) delivered from the secondary side of the supply circuit, wherein the power ($P_d$) delivered by the supply circuit to the magnetron (7) is no more than one quarter of the nominal power ($P_n$) of the magnetron (7) while providing a peak voltage of 3 to 4 kv during start-up of the magnetron;

a waveguide (8) joined to the magnetron;

a cavity resonator (9) jointed to the waveguide (8); and a medical instrument treatment cavity, the magnetron arranged to ionize gas within the medical instrument treatment cavity.

2. The device as in claim 1, wherein, the power ($P_d$) delivered by the supply circuit to the magnetron (7) lies between one tenth and one quarter of the nominal power ($P_n$) of the magnetron, and the nominal power ($P_n$) of the magnetron is no more than 900 W.

3. The device as in claim 1, wherein the power ($P_d$) delivered by the supply circuit to the magnetron is no more than one quarter of the product of the nominal power ($P_n$) of the magnetron multiplied by a reflection coefficient (r) of the magnetron.

4. The device as in claim 1, further comprising limiting means for limiting the power ($P_d$) delivered to the magnetron, such that a temperature of the magnetron does not exceed 80° C.

5. The device as in claim 1, wherein the supply circuit comprises a voltage doubler.

6. The device as in claim 1, wherein the voltage doubler comprises a diode (D) and a capacitor (C) arranged in series at terminals of the second winding of the supply transformer (1), the magnetron (7) being supplied at the terminals of the diode (D).

7. The device as in claim 6, wherein the value of the capacitor (C) is close to 0.1 μF.

8. The device as in claim 1, wherein the voltage doubler comprises a loop formed of i) a first diode (D1) and a second diode (D2) arranged in series, an output of the first diode being joined to an input of the second, and ii) two capacitors (C1, C2), one output terminal (E) of the transformer (1) being joined between the two capacitors (C1,C2) and the other output terminal (F) of the transformer being joined, via a resistance (R), to the input of the second diode (D2), the magnetron (7) being supplied between the input terminal (A') of the first diode (D1) and the output terminal (B') of the second diode (D2).

9. The device as in claim 2, wherein the voltage doubler comprises a loop formed of i) a first diode (D1) connected in series with a second diode (D2), an output of the first diode being joined to an input of the second diode, and ii) two capacitors (C1, C2), one output terminal (E) of the transformer (1) being joined between the two capacitors (C1,C2) and the other output terminal (F) of the transformer being joined, via a resistance (R), to the input of the second diode (D2), the magnetron (7) being supplied between the input terminal (A') of the first diode (D1) and the output terminal (B') of the second diode (D2).

10. The device as in claim 3, wherein the voltage doubler comprises a loop formed of i) a first diode (D1) and a second diode (D2) arranged in series, an output of the first diode being joined to an input of the second, and ii) two capacitors (C1, C2), one output terminal (E) of the transformer (1) being joined between the two capacitors (C1,C2) and the other output terminal (F) of the transformer being joined, via a resistance (R), to the input of the second diode (D2), the magnetron (7) being supplied between the input terminal (A') of the first diode (D1) and the output terminal (B') of the second diode (D2).

11. The device as in claim 4, wherein the voltage doubler comprises a loop formed of i) a first diode (D1) and a second diode (D2) arranged in series, an output of the first diode being joined to an input of the second, and ii) two capacitors (C1, C2), one output terminal (E) of the transformer (1) being joined between the two capacitors (C1,C2) and the other output terminal (F) of the transformer being joined, via a resistance (R), to the input of the second diode (D2), the magnetron (7) being supplied between the input terminal (A') of the first diode (D1) and the output terminal (B') of the second diode (D2).

12. The device as in claim 5, wherein the voltage doubler comprises a loop formed of i) a first diode (D1) and a second diode (D2) arranged in series, an output of the first diode being joined to an input of the second, and ii) two capacitors (C1, C2), one output terminal (E) of the transformer (1) being joined between the two capacitors (C1,C2) and the other output terminal (F) of the transformer being joined, via a resistance (R), to the input of the second diode (D2), the magnetron (7) being supplied between the input terminal (A') of the first diode (D1) and the output terminal (B') of the second diode (D2).

13. The device as in claim 1, wherein, the supply transformer has a ratio of 10, the input side for connection to a peak-to-peak supply voltage of 220 V, and the peak-to-peak output voltage on the secondary winding of 2200 V, the power ($P_d$) delivered by the supply circuit to the magnetron (7) lies between one tenth and one quarter of the nominal power ($P_n$) of the magnetron, and the nominal power ($P_n$) of the magnetron is no more than 800 W, and a power provided by the magnetron arranged to ionize gas within the medical instrument treatment cavity is 100 W.

14. The device as in claim 1, wherein, the supply transformer has a ratio of 10, the input side for connection to a peak-to-peak supply voltage of 220 V, and the peak-to-peak output voltage on the secondary winding of 2200 V, the power ($P_d$) delivered by the supply circuit to the magnetron (7) lies between one tenth and one quarter of the nominal power ($P_n$) of the magnetron, the nominal power ($P_n$) of the magnetron is no more than 300 W, and a power provided by the magnetron arranged to ionize gas within the medical instrument treatment cavity is 100 W.

15. A device for sterilization using a plasma gas by ionisation of a gas, said device comprising:

a supply circuit comprised of a voltage step-up supply transformer (1) having an input side for connection to a peak-to-peak supply voltage of 220 V, and a peak-to-peak output voltage on a secondary winding of 2200 V, the secondary winding having first and second output terminals;

a capacitor, at a first end, connected to the first output terminal of the secondary winding;

a diode connected to a second end of the capacitor;

a microwave source of determined nominal power ($P_n$) connected between the capacitor and the diode, said microwave source connected to the terminals of the secondary winding of the supply circuit, said microwave source comprising a magnetron (7) receiving power ($P_d$) delivered from the secondary side of the supply circuit, the capacitor and the diode forming a voltage doubler multiplying by two the output voltage of the transformer, wherein the power ($P_d$) delivered to the magnetron (7) is no more than one quarter of the nominal power ($P_n$) of the magnetron (7) while providing a peak voltage of 3 to 4 kv during start-up of the magnetron;

a waveguide (8) joined to the magnetron;

a cavity resonator (9) jointed to the waveguide (8);

a medical instrument treatment cavity, the magnetron arranged to ionize gas within the medical instrument treatment cavity.

16. The device of claim 15, wherein, the capacitor has a capacitance (C) of 0.1 μF.

17. The device of claim 15, comprising:

a second capacitor and a second diode, the capacitors and diodes arranged as a double alternating supply to the magnetron in the form of two voltage doublers, wherein a loop is provided comprising the two diodes in series, the first output terminal of transformer joined between the two capacitors and the second output terminal of the transformer joined via a resistance to the input of the second diode, the magnetron supplied between the input terminal of the diode and the output terminal of the second diode.

* * * * *